(12) United States Patent
Ohta

(10) Patent No.: US 11,110,845 B2
(45) Date of Patent: Sep. 7, 2021

(54) WING BODY-TYPE TRUCK VEHICLE

(71) Applicant: Tohru Ohta, Aomori (JP)

(72) Inventor: Tohru Ohta, Aomori (JP)

( * ) Notice: Subject to any disclaimer, the term of this patent is extended or adjusted under 35 U.S.C. 154(b) by 0 days.

(21) Appl. No.: 16/477,580

(22) PCT Filed: Jan. 12, 2018

(86) PCT No.: PCT/JP2018/002363
§ 371 (c)(1),
(2) Date: Jul. 12, 2019

(87) PCT Pub. No.: WO2018/131726
PCT Pub. Date: Jul. 19, 2018

(65) Prior Publication Data
US 2019/0366903 A1    Dec. 5, 2019

(30) Foreign Application Priority Data

Jan. 14, 2017    (JP) .......................... JP2017-000393 U

(51) Int. Cl.
*B60P 3/32*      (2006.01)
*E04B 1/34*      (2006.01)
*E04B 1/343*     (2006.01)

(52) U.S. Cl.
CPC ............ *B60P 3/32* (2013.01); *E04B 1/34336* (2013.01)

(58) Field of Classification Search
CPC .......... B60P 3/32; B60P 3/34; E04B 1/34336; E04B 1/34347
See application file for complete search history.

(56) References Cited

U.S. PATENT DOCUMENTS

| 3,815,949 | A | * | 6/1974 | Ulert ..................... | B62D 33/08 |
| | | | | | 296/175 |
| 4,295,679 | A | * | 10/1981 | Artweger ................. | B60P 3/34 |
| | | | | | 296/171 |
| 5,864,991 | A | * | 2/1999 | Burns ...................... | B60P 3/14 |
| | | | | | 52/67 |
| 5,967,596 | A | * | 10/1999 | Knoop ..................... | B60P 3/36 |
| | | | | | 296/164 |
| 10,167,624 | B1 | * | 1/2019 | Hodgetts ............. | E04B 1/34336 |
| 2003/0155791 | A1 | * | 8/2003 | Gurdjian ................. | B60P 3/34 |
| | | | | | 296/156 |

(Continued)

FOREIGN PATENT DOCUMENTS

| JP | 10250634 | 9/1998 |
| JP | 3066863 | 3/2000 |
| JP | 3156034 | 12/2009 |

OTHER PUBLICATIONS

International Search Report issued in PCT/JP2018/002363 dated Apr. 17, 2018.

*Primary Examiner* — Gregory A Blankenship
(74) *Attorney, Agent, or Firm* — Workman Nydegger

(57) ABSTRACT

With regard to mobile residential facilities such as camping cars, provided is a wing body-type truck vehicle to which a removable residential facility is mounted. When installing a residential facility 4 inside a cargo compartment of the wing body-type truck vehicle, fixing mechanisms 5, 6 are used to prevent the relative movement of the residential facility 4 and a load bed of said truck. When separating the residential facility 4 from the cargo compartment, said fixing mechanisms 5, 6 are removed, thus allowing the residential facility to move.

20 Claims, 3 Drawing Sheets

(56) References Cited

U.S. PATENT DOCUMENTS

| | | | |
|---|---|---|---|
| 2004/0083671 A1* | 5/2004 | Johnson | B65D 90/0033 |
| | | | 52/511 |
| 2007/0252374 A1* | 11/2007 | Gomez-Espana Collignon | |
| | | | B60P 3/32 |
| | | | 280/789 |
| 2011/0209418 A1* | 9/2011 | Drake | B60P 3/34 |
| | | | 52/79.5 |
| 2013/0098263 A1* | 4/2013 | Barry | B61D 47/005 |
| | | | 105/215.2 |
| 2017/0370116 A1* | 12/2017 | Cincotta | E04B 1/34336 |
| 2018/0079348 A1* | 3/2018 | Ronsen | B60P 3/34 |
| 2018/0258658 A1* | 9/2018 | Cruz | E04B 1/34305 |
| 2019/0351806 A1* | 11/2019 | Coulter | B62D 63/064 |
| 2019/0366903 A1* | 12/2019 | Ohta | E04B 1/34336 |

* cited by examiner

WING BODY-TYPE TRUCK VEHICLE

FIELD OF THE INVENTION

The present invention is pertinent to a vehicle suitable for cargo transfer, more specifically, pertinent to a vehicle suitable for transferring, transporting, or carrying in special cargo or a special object and having a housing facility for people.

BACKGROUND OF THE INVENTION

With regard to conventional typical camping cars, the vehicle body is modified to install a residential facility, or wheels are installed on the residential facility in order to allow the camping vehicle to tow the residential facility.

PRIOR LITERATURE

Patent Document

Patent Document: Published examined utility model application S52-14965

Non-Patent Document

SUMMARY OF THE INVENTION

Problem to be Solved by the Invention

The first problem is that for a conventional mobile residential facility that is acquired by modifying a vehicle body, if the vehicle body is not usable, then the residential facility is also simultaneously not usable as a mobile residential facility. The second problem is that for a residential facility which does not have any power source and on which wheels are mounted so as to be towed by a vehicle, although the residential facility can be continuously used by reconnecting the residential facility to a new towing vehicle despite the service life of the old towing vehicle having expired, because the residential facility and outer walls thereof are integrally constructed, if the wheels and the outer walls of the residential facility become damaged, the residential facility is not usable even though the residential facility is not damaged.

Means of Solving the Problems

The present invention considers a wing body-type truck vehicle that includes a first wall that acts as an exterior wing of a load bed of the wing body-type truck vehicle, along with a second wall that acts as the outer wall of a removable residential part on the load bed of the wing body-type truck vehicle, with one side of the truck flipped up to let in outside light. With regard to the first problem described in Problem to be Solved by the Invention in which a vehicle and a residential facility are discarded even though the service lives of the vehicle and the residential facility are different, if the truck vehicle is not usable or there is a desire to replace the truck vehicle, this problem is solved by removing the fixing mechanisms from the load bed frame of the truck vehicle so as to remove the residential facility from the load bed of the truck vehicle, then reconnect the removed residential facility to another truck vehicle. With regard to the second problem in which damage to the outer walls of the residential facility with wheels cannot be removed, this problem is solved by allowing removal of the residential facility from the damaged truck vehicle. In this manner, the problems described in Problem to be Solved by the Invention are solved.

Effects of the Invention

Even if the service life of the wing body-type truck vehicle has expired, leading to its disposal, the residential facility can be continuously used by remounting the residential facility from the load bed of one truck vehicle to the load bed of another truck vehicle. Because the residential facility has a double outer wall that is constructed by the outer wall of the load bed wing of the truck vehicle and the outer wall on the outside of the residential facility, moisture resistance, cold resistance, and crime preventive properties are improved.

DETAILED DESCRIPTION OF THE INVENTION

While a truck vehicle is running, there is no person in the residential facility, so the residential facility is considered freight.

Examples 1 and 2

Figure 1:
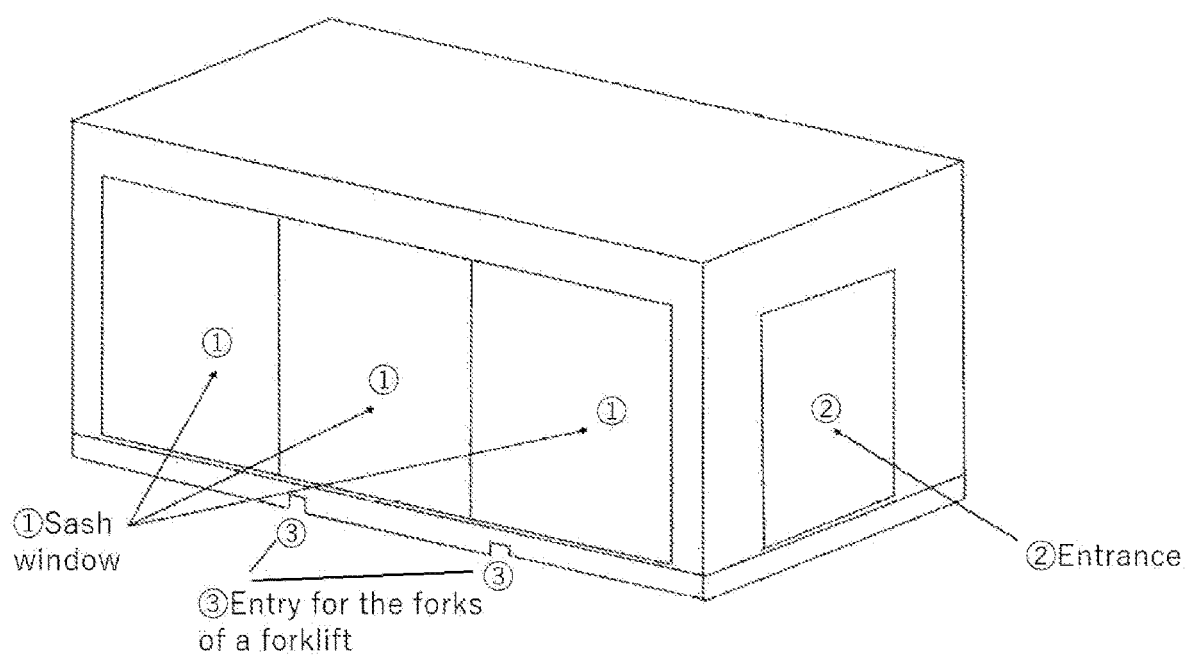
FIG. 1 illustrates an example of a residential facility. (Examples 1 and 2)
Figure 2:
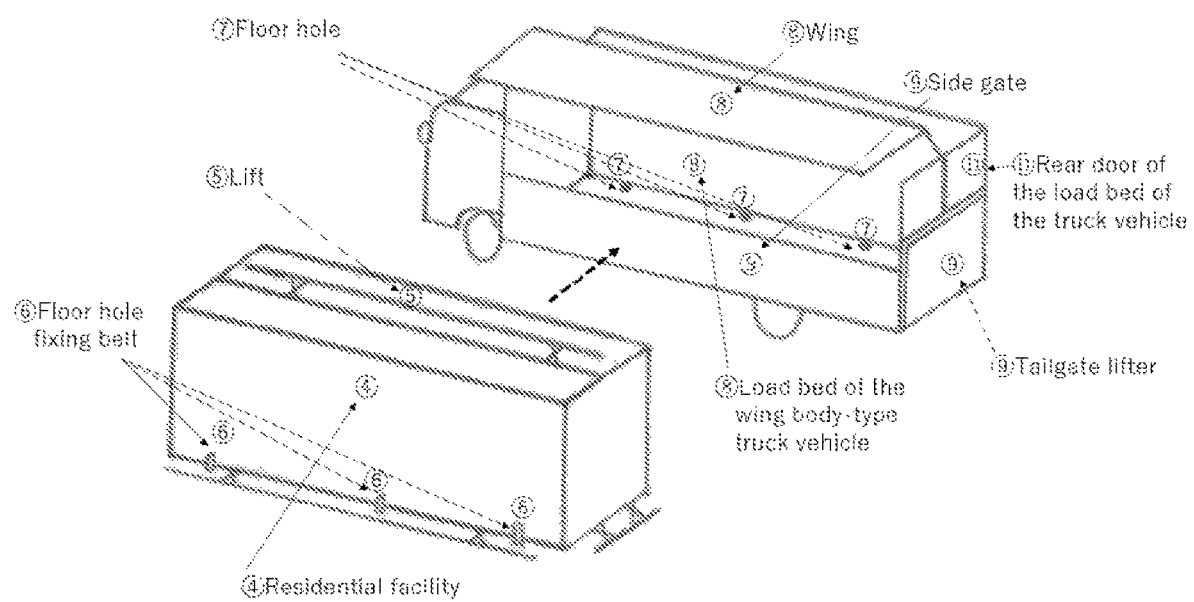
FIG. 2 illustrates how to mount a residential facility and fixing mechanisms on a truck vehicle. (Examples 1 and 2)

How the residential facility according to the present invention is installed on a wing body-type truck vehicle is described below. The wing (reference No. 8 in FIG. 2) of the load bed of the truck vehicle is flipped up. A residential facility (FIG. 1 overall view, reference No. 4 in FIG. 2) is of a size to be mounted on the load bed of the truck vehicle (reference No. 7 in FIG. 2). To mount the residential facility on the load bed of the truck vehicle, the forks (reference No. 3 in FIG. 1) of a forklift are inserted, the residential facility (FIG. 1 overall view) is lifted up, and it is mounted on the load bed of the truck vehicle load bed. The truck vehicle and the residential facility are different in size because they are constructed via separate processes, so a gap is created between the truck vehicle and the residential facility. To fill the gap and prevent the relative movement of the residential facility, fixing mechanisms (reference Nos. 5 and 6 in FIG. 2) are used. Then, the wing of the truck vehicle is flipped down.

Example 3

Figure 3:
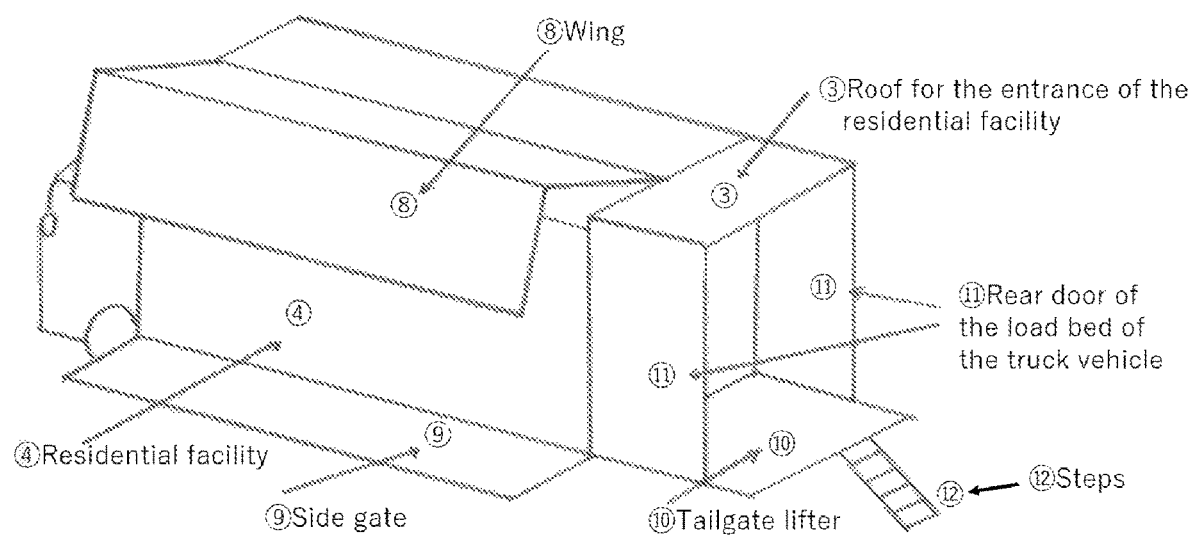
FIG. 3 illustrates how to mount a residential facility on a truck vehicle so as to be used as a residential facility. (Example 3)

Once the truck vehicle is parked, the residential facility may be used. To use the residential facility, one of the wings (reference No. 8 in FIG. 3) is flipped up to let in outside light (reference No. 4 in FIG. 3), after which the side gate (reference No. 9 in FIG. 3) and the tailgate lifter (reference No. 10 in FIG. 3) are leveled to the same height as the residential surface to widen the residential surface. The back door (reference No. 11 in FIG. 3) is opened and the entrance roof (reference No. 3 in FIG. 3) is attached. The steps (reference No. 12 in FIG. 3) are attached for people to climb up and down.

INDUSTRIAL APPLICABILITY

Although a restroom and a toilet may also be mounted on the wing body-type truck vehicle according to the present invention, there are many public restrooms, public baths, and coin laundries in Japan, so these facilities which are necessary for life may be installed outside the truck vehicle residential facility. This invention may also be mounted on a truck with a loading capacity of less than 8 tons so, due to the reform of the driver's license law in 2007, many people with a driver's license for medium-size vehicles will be allowed to drive a truck with a loading capacity of less than 8 tons.

EXPLANATION OF THE SYMBOLS

1 Sash windows of the residential facility
2 Entrance of the residential facility
3 Entry for the forks of a forklift
4 residential facility
5 Fixing mechanism
6 Fixing mechanism
7 Load bed of the wing body-type truck vehicle
8 Wing
9 Side gate
10 Tailgate lifter
11 Rear door for the load bed of the truck vehicle
12 Steps

What is claimed is:

1. A wing body-type truck vehicle to which a removable residential facility is installed,
   the wing body-type truck vehicle comprising:
      a load bed having a load bed frame; and
      a cargo compartment defined at least in part by the load bed and wings above the load bed configured to be selectively raised and lowered;
   the residential facility being removably positioned inside Hall the cargo compartment of the wing body-type truck vehicle and comprising:
      outer walls;
      fixing mechanisms configured to be selectively attached to the load bed frame to prevent relative movement of the residential facility and the load bed of the wing body-type truck vehicle and selectively removed from the load bed frame to allow the residential facility to move relative to the load bed and be removed from the cargo compartment; and
      at least one window in an outer wall that is positioned so as to be selectively covered when an adjacent wing of the wing body-type truck vehicle is selectively lowered and uncovered when the adjacent wing is selectively raised so as to let in outside light.

2. The vehicle and residential facility of claim 1, wherein the load bed frame comprises a plurality of floor holes corresponding to the fixing mechanisms residential facility that are selectively attached to and removed from the load bed frame.

3. The vehicle and residential facility of claim 2, wherein the fixing mechanisms comprise a plurality of floor hole fixing belts corresponding to the plurality of floor holes.

4. The vehicle and residential facility of claim 1, where the residential facility includes a roof and an additional fixing mechanism associated with the roof configured to assist in preventing relative movement of the residential facility and the load bed of the vehicle.

5. The vehicle and residential facility of claim 1, wherein the residential facility further includes an entrance.

6. The vehicle and residential facility of claim 5, wherein the vehicle further comprises a tailgate lifter configured to be selectively raised and lowered.

7. The vehicle and residential facility of claim 6, wherein the tailgate lifter is configured to be positioned at a same height as a residential surface of the residential facility adjacent to the entrance in order to enlarge the residential surface.

8. The vehicle and residential facility of claim 7, further comprising steps that can be attached to the tailgate lifter for people to climb up and down.

9. The vehicle and residential facility of claim 7, the vehicle further comprises a side gate configured to be selectively raised to partially cover an outer wall of the residential facility and selectively lowered to a same height as the residential surface in order to enlarge the residential surface.

10. The vehicle and residential facility of claim 5, wherein the vehicle further comprises a rear door configured to be selectively opened and closed to selectively cover and uncover the entrance of the residential facility.

11. The vehicle and residential facility of claim 10, further comprising an entrance roof that can be selectively attached adjacent to the entrance and rear door.

12. The vehicle and residential facility of claim 1, wherein the residential facility comprises a plurality of windows that are positioned so as to be selectively covered when an adjacent wing of the wing body-type truck vehicle is lowered and uncovered when the adjacent wing is raised.

13. The vehicle and residential facility of claim 1, wherein the outer walls of the residential facility and the wings of the vehicle provide a double outer wall.

14. A wing body-type truck vehicle to which a removable residential facility is installed,
   the wing body-type truck vehicle comprising:
      a load bed having a load bed frame; and
      a cargo compartment defined at least in part by the load bed, wings above the load bed configured to be selectively raised and lowered, a rear door configured to be selectively opened and closed, and a tailgate lifter adjacent to the rear door and configured to be selectively raised and lowered;
   the residential facility being removably positioned inside the cargo compartment of the wing body-type truck vehicle and comprising:
      outer walls;
      fixing mechanisms configured to be selectively attached to the load bed frame to prevent relative movement of the residential facility and the load bed of the wing body-type truck vehicle and selectively removed from the load bed frame to allow the residential facility to move relative to the load bed and be removed from the cargo compartment;
      a plurality of windows in an outer wall that are positioned so as to be selectively covered when an adjacent wing of the wing body-type truck vehicle is lowered and uncovered when the adjacent wing is raised so as to let in outside light; and
      an entrance that is positioned so as to be selectively covered when the rear door of the vehicle is selectively closed and uncovered when the rear door is selectively opened.

15. The vehicle and residential facility of claim 14, wherein the load bed frame comprises a plurality of floor holes and the fixing mechanisms comprise a plurality of floor hole fixing belts corresponding to the plurality of floor holes.

16. The vehicle and residential facility of claim 14, wherein the residential facility includes a roof and an additional fixing mechanism associated with the roof configured to assist in preventing relative movement of the residential facility and the load bed of the vehicle.

17. The vehicle and residential facility of claim 14, wherein the tailgate lifter is configured to be lowered to a same height as a residential surface of the residential facility in order to lengthen the residential surface, the vehicle and residential facility further comprising steps that can be attached to the tailgate lifter for people to climb up and down.

18. The vehicle and residential facility of claim 14, wherein the vehicle further comprises a side gate configured to be selectively raised to partially cover an outer wall of the residential facility and lowered to a same height as the residential surface in order to widen the residential surface.

19. The vehicle and residential facility of claim 14, further comprising an entrance roof that can be attached adjacent to the entrance and rear door.

20. A wing body-type truck vehicle to which a removable residential facility is installed,
the wing body-type truck vehicle comprising:
  a load bed having a load bed frame; and
  a cargo compartment defined at least in part by the load bed, wings above the load bed configured to be selectively raised and lowered, a side gate configured to be selectively raised and lowered, a rear door configured to be selectively opened and closed, and a tailgate lifter adjacent to the rear door and configured to be selectively raised and lowered;
the residential facility being removably positioned inside the cargo compartment of the wing body-type truck vehicle and comprising:
  outer walls;
  fixing mechanisms configured to be selectively attached to the load bed frame to prevent relative movement of the residential facility and the load bed of the wing body-type truck vehicle and selectively removed from the load bed frame to allow the residential facility to move relative to the load bed and be removed from the cargo compartment;
  a plurality of windows in an outer wall that are positioned so as to be selectively covered when an adjacent wing of the wing body-type truck vehicle is lowered and uncovered when the adjacent wing is raised so as to let in outside light;
  an entrance that is positioned so as to be selectively covered when the rear door of the vehicle is selectively closed and uncovered when the rear door is selectively opened;
  steps that can be attached to the tailgate lifter; and
  an entrance roof that can be attached adjacent to the entrance and rear door.

* * * * *